Oct. 2, 1945.   E. W. DAVIS   2,385,798
FLOW RESTRICTING VALVE FOR OILING SYSTEMS
Filed Dec. 16, 1942   2 Sheets-Sheet 1
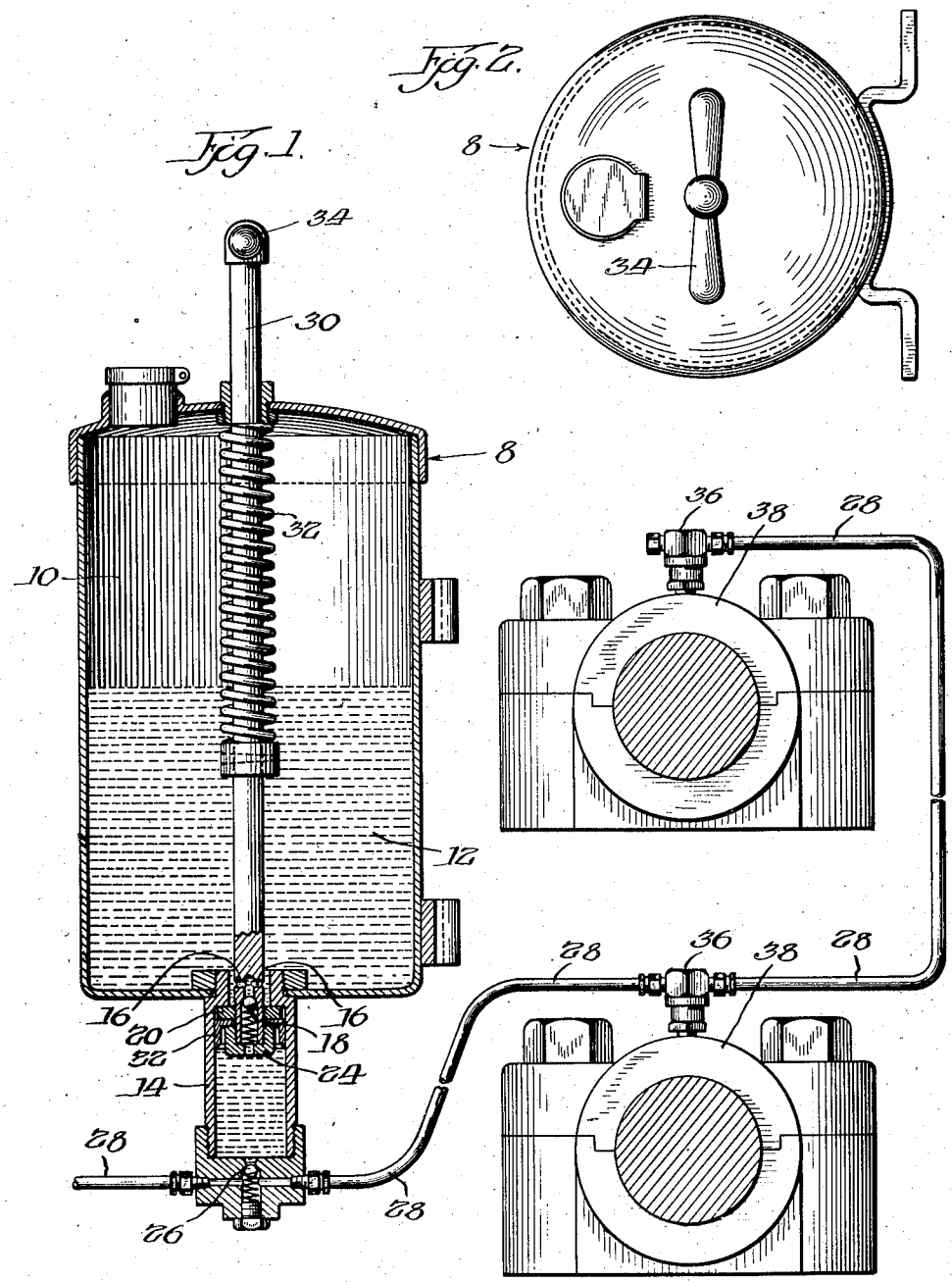
Inventor:
Ernest W. Davis Oct. 2, 1945.  E. W. DAVIS  2,385,798
FLOW RESTRICTING VALVE FOR OILING SYSTEMS
Filed Dec. 16, 1942  2 Sheets-Sheet 2
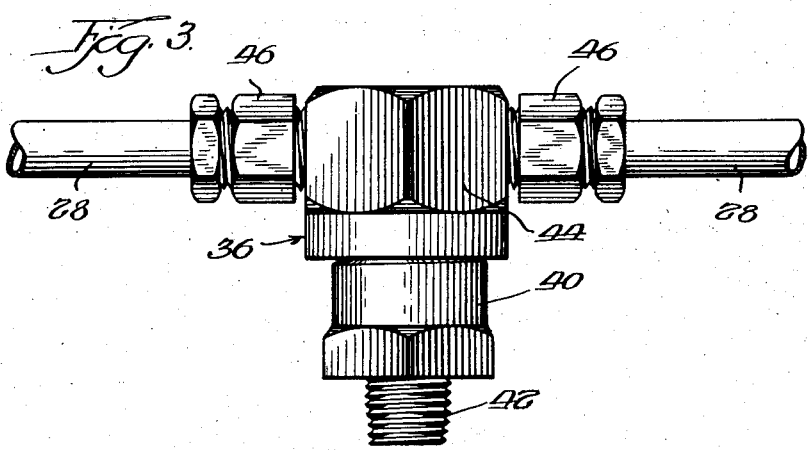
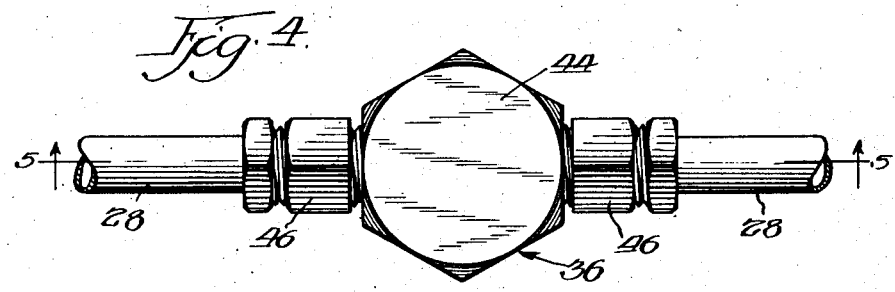
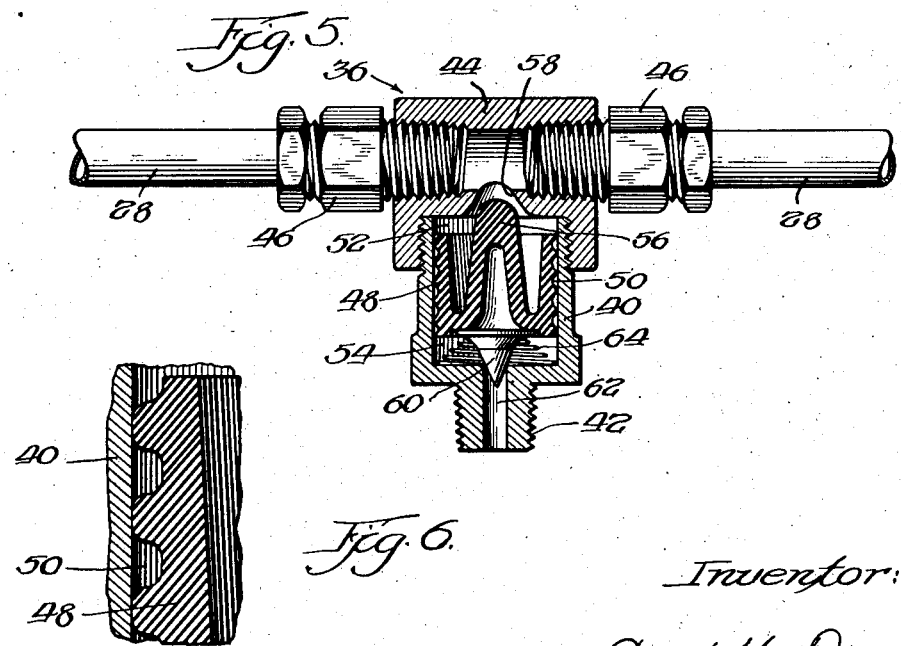
Inventor:
Ernest W. Davis Patented Oct. 2, 1945

2,385,798

UNITED STATES PATENT OFFICE 2,385,798

FLOW RESTRICTING VALVE FOR OILING SYSTEMS

Ernest W. Davis, River Forest, Ill.

Application December 16, 1942, Serial No. 469,175

4 Claims. (Cl. 277—42)

My invention relates to resistance-controlled, centralized oiling systems in which a single pump supplies oil under pressure to a plurality of flow-restricting fittings, each having a flow-restricting passageway for proportioning the flow of oil to its respective bearing. In lubricating systems of this class it is customary to provide a central pump, from which an arterial system of copper tubes conducts oil to a plurality of bearings, each of which is provided with a flow-restricting fitting of rated flow, whereby the flow-restricting characteristics of the various fittings determine the proportional distribution of the oil delivered by the pump.

The general object of this invention is to provide a centralized oiling system of the class described which can be manufactured at low cost, and which accurately proportions the flow of oil under the wide range of conditions encountered in actual practice.

A more specific object is to provide such a system which permits the use of flow-restricting fittings having flow-restricting passageways of larger sectional area than those used in prior systems of this class. This reduces the possibility of clogging due to the presence of scale, lint, or other impurities in the oil, and reduces the proportional effect of unavoidable, dimensional variations necessitated by manufacturing tolerances.

Another object is to permit the use of small tubing in the oil line without producing a relatively high rate of flow in bearings near the pump and a relatively low rate of flow in those bearings more remote from the pump.

Another object is to prevent overlubrication of bearings located at a low elevation, where the hydrostatic pressure of the oil is highest, and underlubrication of bearings located at higher elevations, where the hydrostatic pressure of the oil is lower.

Another object is to provide an oiling system of the class described which is accurate in performance and which does not require high-precision machining operations in its manufacture.

A further object is to prevent siphoning and draining of the oil in the oil line during the time interval between lubricating operations. These and other objects will appear as the description proceeds.

In the drawings:

Figure 1 is an elevation of the improved lubricating system of this invention, with the pump shown in longitudinal section through the center line;

Figure 2 is a plan view of the pump shown in Figure 1;

Figure 3 is an enlarged elevation of the flow-restricting fitting used in this invention;

Figure 4 is an enlarged plan view of the flow-restricting fitting;

Figure 5 is an enlarged sectional elevation of the flow-restricting fitting, the section being taken on the line 5, 5 in Figure 4; and Figure 6 is a further enlarged sectional elevation of the wall of the piston shown in Figure 5.

Referring to Figure 1, the centralized pump 8 is provided with an oil reservoir 10 for containing oil 12, which is fed to the cylinder 14 through the ports 16, 16. The inlet check valve 18 prevents reverse flow. The piston plate 20, and synthetic rubber cup 22 are locked in position by the nut 24. The outlet check valve 26 permits oil to flow from the cylinder 14 to the oil line 28, and prevents reverse flow. The piston rod 30 is urged downwardly by the spring 32, which is compressed by pulling upwardly on the handle 34.

The flow-restricting fittings 36 are each attached to a bearing 38, requiring lubrication, and are connected in the oil line 28, which receives intermittent, measured shots of oil at a predetermined pressure from the pump 8. A considerable number of these flow-restricting fittings may be supplied with oil delivered from a single pump, and it is customary to use T's and crosses (not shown) in the installation of the arterial system of tubing which connects the flow-restricting fittings 36 with the pump 8.

Each flow-restricting fitting includes a body member 40 provided with screw threads 42, by means of which the fitting may be attached to a bearing requiring lubrication. The body member 40 is also threaded at the upper end to receive the cap 44, which is threaded to receive the tube couplings 46, for making oil tight connections with the oil line 28.

The piston 48 is made of synthetic rubber, and is provided with a helical groove 50, which forms a flow-restricting passageway connecting the space 52, above the piston 48, and the space 54, below the piston 48. The dimensions of the groove 50 may be different in the several flow-restricting fittings in the lubricant line, so as to supply oil in quantities proportional to the lubricating requirements of the respective bearings, which bearings may likely vary in size, load, spindle speed, and other conditions. The piston 48 is provided with a check valve portion 56, which engages the valve seat 58 to form an oil tight seal therewith.

The metal throttle valve 60 seats on the edge of the bore 62, and is urged upwardly by the spring 64, whereby the piston 48 is also urged upwardly to close the check valve 56 against its seat 58.

The operation of this oiling system is as follows: The operator raises the pump handle 34, thereby compressing the spring 32. He then releases the handle 34. During the upward movement of the piston rod 30, oil 12 flows through the ports 16, 16, and the check valve 18, and into the cylinder 14. When the handle 34 is released, the spring 32 applies pressure to the oil in the cylinder 14, which pressure is maintained while the piston rod 30 slowly descends to force the oil slowly through the oil line and the flow-restricting fittings 36. This action continues until the predetermined quantity of oil which has been drawn into the cylinder 14 has been discharged through the flow-restricting fittings 36, 36, which proportion the flow of oil in the manner hereinbefore described.

When the pump 8 applies pressure to the oil line 28, the check valve 56, in each flow-restricting fitting is opened, and the spring 64 is slightly compressed. As soon as the check valve 56 leaves its seat 58, the oil pressure acts on the entire area of the piston 48, whereby the piston 48 moves downwardly until the throttle valve 60 is nearly closed, whereupon the pressure in the space 54 rises to a pressure only slightly lower than the pressure in the space 52. The exact pressure difference between the space 52 and the space 54 is determined by the strength of the spring 64. This differential pressure causes oil to flow slowly through the helical groove 50.

If the differential pressure becomes slightly higher than normal, it causes the throttle valve 60 to close slightly, thereby decreasing the differential pressure by causing the pressure to build up in the space 54. On the other hand, if the differential pressure should drop slightly below normal, then the spring 64, which resists the differential pressure, will raise the throttle valve 60 a slight distance, thereby reducing the pressure in the space 54, and thus increasing the differential pressure. The differential pressure is thus maintained substantially constant by the combined action of the spring 64 and the throttle valve 60.

The spring 64 is made light enough so that the spring 32 in the pump 8, will produce sufficient oil pressure to open the check valve 56. It will be observed that the area of the bore 62 is considerably smaller than the area of the valve seat 58. This is to prevent the line pressure, which must be high enough to unseat the check valve 56, from locking the throttle valve 60 in its closed position. In order to be operative, the force of the spring 64 in pounds, divided by the area of the bore 62, in square inches, must give a value in excess of the line pressure in pounds per square inch.

The advantage of this construction is that the rate of flow of each flow-restricting fitting is determined by the dimensions of its flow-restricting passageway and is not affected by differences in line pressure which might occur in locations at various distances from the pump, or at various heights. The pressure regulating effect previously described provides a low, substantially uniform, predetermined, differential pressure across the flow-restricting passageway of each flow-restricting fitting, regardless of its location in the installation, even when it is connected in a long oil line of small diameter.

I claim:

1. In a flow-restricting fitting for a centralized oiling system, a cylinder having an inlet and an outlet; a piston constructed of resilient material and movable longitudinally in said cylinder; flow-restricting means for conducting oil from said inlet to said outlet; a check valve for said inlet, said check valve being integral with said piston; a throttle valve for said outlet, said throttle valve abutting said piston and receiving motion therefrom; a spring for urging said check valve towards its closed position and for urging said throttle valve towards its open position; and a hollow stem for said check valve, said stem being integral with said piston and said check valve.

2. In a flow-restricting fitting for a centralized oiling system, a body portion having an inlet and an outlet; a check valve for said inlet; a throttle valve for said outlet; a flow-restricting passageway between said inlet and said outlet; and means responsive to the pressure difference across said passageway for actuating said valves, said inlet valve being constructed of relatively yielding material, and said outlet valve being constructed of relatively unyielding material.

3. For use in a centralized oiling system, an oil metering device having an inlet opening for connection to a source of oil under pressure and an outlet opening for connection to a part to receive oil, a part of said device forming a cylinder between said inlet and said outlet, a piston element of relatively soft rubber-like material having a tortuously grooved cylindrical surface in sliding engagement with the wall of said cylinder, said element having a valve part cooperable with said inlet opening, a throttle valve cooperable with said outlet opening, a spring cooperating with said throttle valve to urge the latter away from said outlet opening thereby to increase the possible rate of oil flow through said outlet port, said spring also forcing said throttle valve against said piston element in a direction to move the valve part of the latter into sealing engagement with said inlet opening, said latter movement being resisted by the differential oil pressure on the opposite end faces of the piston element due to the pressure drop of the oil flowing through the tortuous groove in the cylindrical surface of the piston element.

4. As an article of manufacture, a resistance plug for insertion in a flow metering device having a cylindrical bore, said plug comprising a hollow cylindrical outer portion and a hollow tapered inner portion closed at one end and integrally formed at its open end with one end of said cylindrical portion, the closed end extending beyond the other end of said cylindrical outer portion, said plug being made of a relatively soft synthetic rubber-like material and the outer cylindrical surface thereof being provided with a helical groove extending from one end of the cylindrical surface to the other, the diameter of the ridges between the grooves being of sufficiently greater diameter than that of the cylindrical bore in which the plug is to be used, whereby said plug, due to its elasticity, may be pressed into the bore to form therewith a long helical passageway for restricting the flow of lubricant through the bore.

ERNEST W. DAVIS.